US010114805B1

(12) United States Patent
Root (10) Patent No.: US 10,114,805 B1
(45) Date of Patent: Oct. 30, 2018

(54) INLINE ADDRESS COMMANDS FOR CONTENT CUSTOMIZATION

(71) Applicant: Amazon Technologies, Inc., Reno, NV (US)

(72) Inventor: Andrew Thomas Root, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 388 days.

(21) Appl. No.: 14/306,932

(22) Filed: Jun. 17, 2014

(51) Int. Cl.
*G06F 17/22* (2006.01)

(52) U.S. Cl.
CPC ............... *G06F 17/2247* (2013.01)

(58) Field of Classification Search
CPC . G06F 17/22; G06F 17/30887; G06F 17/2235
See application file for complete search history.

(56) References Cited

U.S. PATENT DOCUMENTS

| | | | | |
|---|---|---|---|---|
| 6,061,701 A * | 5/2000 | Hirai | .................. | G06F 17/272 715/236 |
| 7,051,084 B1 * | 5/2006 | Hayton | ................ | G06F 17/3089 707/E17.116 |
| 7,899,805 B2 * | 3/2011 | Stewart | ............. | G06F 17/30887 707/708 |
| 8,042,036 B1 * | 10/2011 | Sharma | ............. | G06F 17/30882 715/208 |
| 8,060,414 B1 * | 11/2011 | Lin | ........................ | G06Q 30/06 705/26.1 |
| 8,225,191 B1 * | 7/2012 | Kalman | ............. | G06F 17/30873 707/620 |
| 8,504,543 B1 * | 8/2013 | Andreessen | ............ | H04L 67/02 707/705 |
| 8,719,416 B1 * | 5/2014 | Goel | .................. | G06F 17/30887 709/206 |
| 2001/0032254 A1 * | 10/2001 | Hawkins | ............. | G06F 17/3089 709/219 |
| 2004/0267961 A1 * | 12/2004 | Dietz | ................ | G06F 17/30887 709/245 |
| 2005/0055437 A1 * | 3/2005 | Burckart | ........... | G06F 17/30949 709/224 |

(Continued)

OTHER PUBLICATIONS

Manu Sporny, Nov. 20, 2008, https://lists.w3.org/Archives/Public/public-rdf-in-xhtml-tf/2008Nov/0043.html, (hashmarks.pdf), pp. 1-3.*

(Continued)

*Primary Examiner* — Scott T Baderman
*Assistant Examiner* — Sookil J Lee
(74) *Attorney, Agent, or Firm* — Kilpatrick Townsend & Stockton LLP (57) ABSTRACT

Systems and methods involve updating a portion of a network document, while leaving the rest of the document unchanged. A computing device may provide a network document for display. The computing device is configured to receive a request via a command line that identifies a portion of the network document as well as a change to be made to that portion of the network document. Upon receiving the request, the computing device is configured to update only that portion of the network document that was identified in the request to reflect the change indicated. The update is then displayed by the computing device.

19 Claims, 7 Drawing Sheets

(56) References Cited

U.S. PATENT DOCUMENTS

| | | | | |
|---|---|---|---|---|
| 2006/0031411 | A1* | 2/2006 | Gimson | G06F 17/30905 709/219 |
| 2006/0184869 | A1* | 8/2006 | Tiffany | G06F 17/30905 715/207 |
| 2007/0136415 | A1* | 6/2007 | Behl | G06F 17/30873 709/203 |
| 2007/0143672 | A1* | 6/2007 | Lipton | G06F 17/30899 715/205 |
| 2007/0234195 | A1* | 10/2007 | Wells | G06F 17/30905 715/205 |
| 2008/0021977 | A1* | 1/2008 | Jones | G06F 17/241 709/217 |
| 2008/0046845 | A1* | 2/2008 | Chandra | G06F 17/30905 715/856 |
| 2008/0077851 | A1* | 3/2008 | Hesmer | G06F 8/38 715/234 |
| 2008/0148145 | A1* | 6/2008 | Jacob | G06F 17/3089 715/243 |
| 2008/0155110 | A1* | 6/2008 | Morris | H04L 61/301 709/230 |
| 2009/0015599 | A1* | 1/2009 | Bennett | G06F 3/0486 345/680 |
| 2009/0063538 | A1* | 3/2009 | Chitrapura | G06F 17/30887 |
| 2009/0063946 | A1* | 3/2009 | Balasubramanian | G06F 17/24 715/205 |
| 2010/0070929 | A1* | 3/2010 | Behl | G06F 17/3089 715/854 |
| 2010/0180011 | A1* | 7/2010 | Sood | G06F 15/16 709/219 |
| 2010/0192054 | A1* | 7/2010 | Nauerz | G06F 17/241 715/234 |
| 2010/0217771 | A1* | 8/2010 | Nash | G06F 17/30873 707/769 |
| 2010/0235528 | A1* | 9/2010 | Bocharov | H04N 21/6437 709/231 |
| 2010/0332515 | A1* | 12/2010 | Carraher | G06F 17/30545 707/769 |
| 2011/0296289 | A1* | 12/2011 | Tokashiki | G06F 9/4843 715/205 |
| 2012/0047423 | A1* | 2/2012 | Tomkow | G06F 17/241 715/205 |
| 2012/0191840 | A1* | 7/2012 | Gordon | G06F 17/30887 709/223 |
| 2013/0073536 | A1* | 3/2013 | Fedorynski | G06F 17/30887 707/709 |
| 2013/0191435 | A1* | 7/2013 | Gittelman | G06F 17/30899 709/201 |
| 2013/0263047 | A1* | 10/2013 | Allen | G06F 3/04845 715/790 |
| 2014/0059420 | A1* | 2/2014 | Cole | G06F 17/30882 715/234 |
| 2014/0157106 | A1* | 6/2014 | Bertram | G06F 17/2247 715/234 |
| 2014/0195961 | A1* | 7/2014 | Shoemaker | G06F 3/0483 715/776 |
| 2014/0214788 | A1* | 7/2014 | Koutrika | G06F 17/30887 707/708 |
| 2014/0280739 | A1* | 9/2014 | Ljubin | H04L 67/02 709/218 |
| 2014/0280789 | A1* | 9/2014 | Swaminathan | H04L 65/4084 709/219 |
| 2014/0325089 | A1* | 10/2014 | Lin | H04L 63/10 709/245 |
| 2015/0088648 | A1* | 3/2015 | Chitnis | G06Q 30/0256 705/14.54 |
| 2015/0088965 | A1* | 3/2015 | Pakulski | H04N 21/2387 709/203 |
| 2015/0142941 | A1* | 5/2015 | Barwicki | H04L 41/0226 709/223 |
| 2016/0378725 | A1* | 12/2016 | Marchsreiter | G06F 17/2229 715/255 |

OTHER PUBLICATIONS

Stack overflow, Dec. 28, 2012, Pre-fill form field via URL in html, https://stackoverflow.com/questions/14070105/pre-fill-form-field-via-url-in-html (javascript—Pre-fill form field via URL in html—Stack Overflow.pdf), pp. 1-2.*

Cass, Apr. 5, 2010, How to pre-fill items on your MailChimp hosted form, https://blog.mailchimp.com/how-to-pre-fill-items-on-your-mailchimp-hosted-form/ (Cass.pdf), pp. 1-21.*

Form Assembly, Jun. 2, 2014, Prefill Through the URL, https://web.archive.org/web/20140602015546/http://help.formassembly.com:80/knowledgebase/articles/340353-prefill-through-the-url (Prefill Through the URL.pdf), pp. 1-7.*

Owasp, Testing for cookies attributes (OTG-SESS-002) (Testing for cookies attributes.pdf), May 17, 2014 https://www.owasp.org/index.php?title=Testing_for_cookies_attributes_(OTG-SESS-002)&oldid=175195, pp. 1-4 (Year: 2014).*

* cited by examiner

INLINE ADDRESS COMMANDS FOR CONTENT CUSTOMIZATION

BACKGROUND

In the early days of the Internet, most web sites were based on complete hypertext markup language (HTML) pages. Each action that was performed required that a complete page be loaded from the server. This process was inefficient, as all page content disappeared, and was regenerated. Each time the browser reloaded a page because of a partial change, all of the content had to be re-sent, even though only some of the information had changed. This places additional load on the server and uses excessive bandwidth.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include web applications which can send data to, and retrieve data from, a server asynchronously (in the background) without interfering with the display and behavior of the existing page. In some aspects of the disclosure, a user may be able to alter one or more portions of a website, while leaving the rest of the website unchanged, through the use of inline representational state transfer (REST) commands. In some embodiments of the disclosure, inline commands for updating portions of a website may be appended to a uniform resource locator (URL). Inline commands (or inline requests) may, in some examples, be those that are inserted as text into an input line (e.g., a command line, URL line, or the like) and may contain elements that indicate a portion of a website to be updated as well as an update to be made to that portion of the website. In addition to those elements, the inline command may contain parameters that apply to the update.

By way of example, given the URL "http://www.example.com/#/#search-results/POST/search/cooking/page/1," the domain name is "http://www.example.com/," the "#" indicates the beginning of the inline command, and the inline command is "/#search-results/POST/search/cooking/page/1." In this example, "#search-results" may be a selector, which indicates the element on the page that may be modified. The next part, "POST/search" may be an action indicator, which indicates an action to be taken with regard to the "#search-results" selector. In the example given, "POST" may be a method to be performed on the selector. If the action indicator does not include a method, then a default method may be applied. The "/search" is the controller, which may contain parameters, /cooking/page/1. In this example, when the URL is altered to "http://www.example.com/#/#search-results/POST/search/cooking/page/2," the new URL may be analyzed. Once it is determined that the domain name has not changed, the inline command may then be analyzed. Since the inline command has been altered to "/#search-results/POST/search/cooking/page/2," the inline command may be parsed to identify the new selector, method, controller, and parameters. In this example, only the parameters have been altered. The method may then trigger an asynchronous HTTP request sent to the controller to update the search results section of the web page based on the provided parameters (e.g., as opposed to the whole page). In this case, page 2 of the search results may be appended to the element indicated by the selector #search-results while the rest of the web page remains unchanged.

In some embodiments, the URL may be shortened, such as through the use of a URL shortener. With the use of these URL shorteners, the long URL may be stored and associated with a code or set of symbols. It is envisioned that this disclosure is equally applicable to shortened URLs.

In some embodiments, the action indicator may include methods (such as HTTP methods) that may be used to perform actions such as putting, posting, replacing, or deleting content to a webpage. These methods may be used to resize the page or add or subtract content as it is needed. For example, rather than "scrolling" down a page, a command line may be used to remove a portion from the top of the content and add a portion to the bottom of the content. In this scenario, the command line may be altered by selecting a web page object, such as a button on the page, a keyboard or a mouse button, or it may be timed to change automatically.

In some embodiments, the selector and action indicator may be used to add, delete, or replace current content on a web page. For example, given the uniform resource locator http://www.example.com/#/#search-1/after/search/2/12 The response body from the HTTP request "search/2/12" would be added to the content after element "#search-1." As another example, given the uniform resource locator http://www.example.com/#/#search-2/before/search/1/12, the response body from the HTTP request "search/1/12" would be appended to the web page content before the element "#search-2." As another example, given the uniform resource locator http://www.example.com/#/#search-1/replace/search/1/12, the response body from the HTTP request "search/1/12" would replace element "#search-1." In some embodiments, the selector and action indicator may be used to alter the appearance of the portion of the web page indicated by the selector. For example, the uniform resource locator http://www.example.com/#/body/background-color/blue may be used to change the background color for the body of the web page to blue. Additionally, multiple changes can be made to web page content with a single command line. For example, a uniform resource locator may contain http://www.example.com/#/#product-title/font/verdana|/body/background-color/blue. In this example, the "|" acts as a separator, which is a symbol or phrase that indicates a new input. In this example, the font of the product title is set to verdana and the background color for the body of the web page is set to blue.

In some embodiments in which the command line is a part of the URL, the URL is analyzed each time that a change is detected. If the domain name portion of the URL is altered, then the browser loads the new page associated with that domain name. If, however, the changes to the URL are only in the command line portion, then the command line is parsed to determine the affected web page segments and their respective updates. Updates are then made to each affected segment of the web page without a need to update the web page as a whole.

In addition to allowing a user to manually update a command line, elements of the graphic user interface (GUI) may also be able to alter a command line. For example, in some embodiments of the disclosure, a "back" or "next" button may be made available on the web page. Instead of reloading an entire page (as is done by the back and forward buttons on the browser), these buttons might alter the command line, causing only a portion of the web page to change. This technique can be used to morph a page using the address while preserving the back and forward buttons on the browser. It also creates a unique navigation experience where the entire page never refreshes; only specific elements on the page change.

In some embodiments, customizations can be saved by a user, such as by bookmarking command lines. Saved command lines may then be appended to each website that the user visits or may be saved for a particular site. By doing this, users are able to customize a wide range of websites that they visit. For example, a user may be able to save a command line which puts the footer into bold type-face. This command line may then be appended to each web page that the user visits, allowing a more customizable user experience.

Additionally, a customized command line may be provided when a user is directed to a webpage. For example, a generic or basic web page can be provided by a website host. When a user is directed to the generic page by another source, a command line may be provided in the URL that determines the content to be populated on the page or how the page appears to the user. For example, several vendors may be interested in selling a product or web service. Some embodiments of the current disclosure would allow each vendor to link to a single generic web page for the product. By providing a potential customer with a customized command line, an individual vendor can then customize the website that the customer sees. Additionally, each vendor may be able to provide unique tools or widgets for his or her customers. This allows vendors to provide a unique customer experience while also providing a single point of sale for the product.

Figure 1:
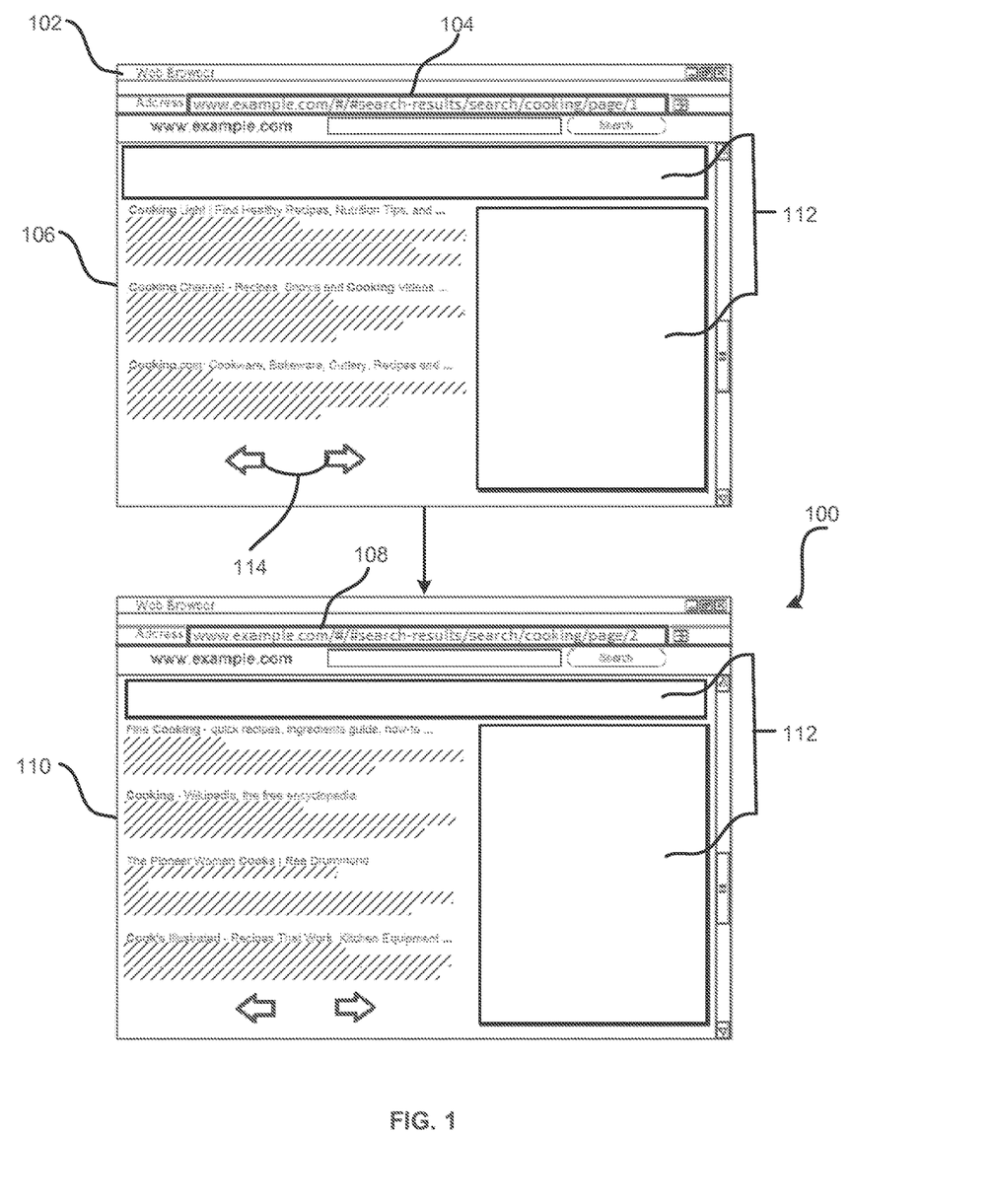
FIG. 1 illustrates a sample web page (or network document) in which segments or portions of the web page can be updated asynchronously.

FIG. 1 illustrates a sample web page 100 (or network document) in which segments or portions of the web page 100 can be updated asynchronously. In some embodiments of the disclosure, the web page 100 is displayed by a browser application 102. In embodiments in which the web page 100 is displayed by a browser 102, users may be able to enter an input line 104 into the address bar of the browser 102.

The input line 104 may be directed to a designated portion 106 of the web page 100. When an updated input line 108 is entered into the address bar of the browser 102, the designated portion 106 is replaced with an updated portion 110 of the web page. Only the designated portion 106 of the web page 100 is updated, leaving undesignated portions 112 of the web page unaltered. The input line 104 may be altered manually, or it may be altered through the use of optional inputs 114 such as webpage objects. For one example of such an optional input 114, a user may be able to select a button associated with the web page 100. By selecting the button, a portion of the input line 104 may be altered instead of linking to a separate web page document.

Figure 2:
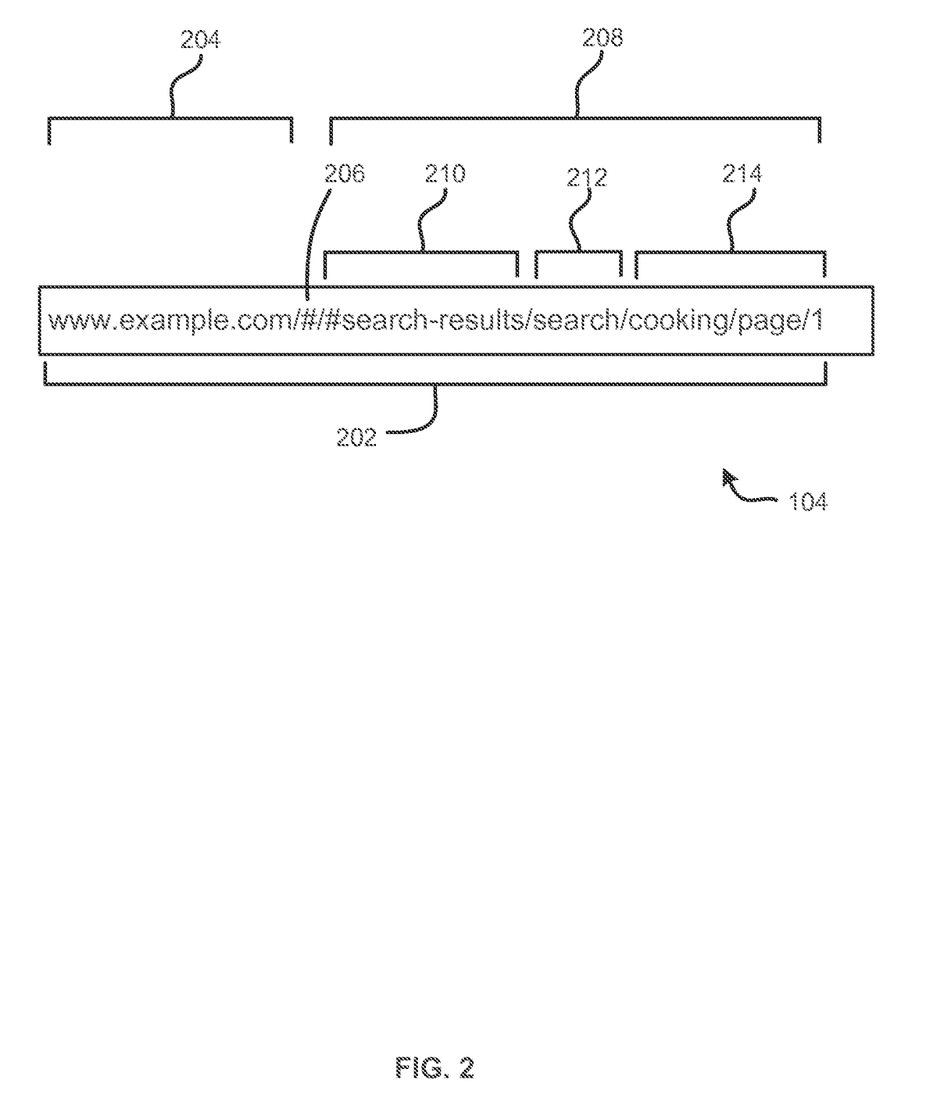
FIG. 2 illustrates an example input line for one embodiment of the disclosure.

FIG. 2 illustrates an example embodiment of an input line 104. In some embodiments, the input line 104 may comprise input 202 of at least one of a domain name 204, an indicator 206, and an inline command 208. An inline command can comprise one or more of a selector 210, an action indicator 212, and parameter(s) 214.

In some embodiments, the input 202 may be a uniform resource locator (URL) which is entered into the address bar of the browser 102. In another embodiment, the input 202 may be located somewhere on a webpage that is separate from the address bar. In yet another embodiment, the input 202 may be located in a graphic user interface (GUI) of an application that is separate from the browser 102. The input 202 may be generated/updated by a user or it may be generated/updated by an application.

In embodiments that include an indicator 206, the indicator 206 may be used to indicate that an inline command 208 is present in the input 202 by marking its beginning. The indicator 206 may consist of any symbol or set of symbols capable of indicating the beginning of an inline command 208.

In one embodiment, the inline command 208 may comprise of a selector 210 and an action indicator 212. In other embodiments, the inline command may comprise of several elements, including one or more selector(s) 210, one or more action indicator(s) 212, and one or more parameters 214.

The selector 210 indicates at least one element of the web page that is to be updated asynchronously with relation to the rest of the web page. The selector 210 can be a cascading style sheets (CSS) selector or any other pattern which indicates a portion of the web page to be updated, to include a descriptor of a specific element (header, body, footer, etc.), a section label, coordinates, etc.

The action indicator 214 indicates an action to be taken with regard to the web page segment(s) indicated by the selector 210. The action may be to execute a command, method, or function and/or make a HTTP or HTTPS request. For example, in some embodiments, the action indicator may be used to execute a PUT method and implement an application or widget within the web page segment indicated by the selector 210. The input 202 may also contain parameters 216 that are sent to the action indicator 212. The parameter(s) 214 may be used to modify or set bounds to the action indicator 212, or they may function as inputs for a method call.

Figure 3:
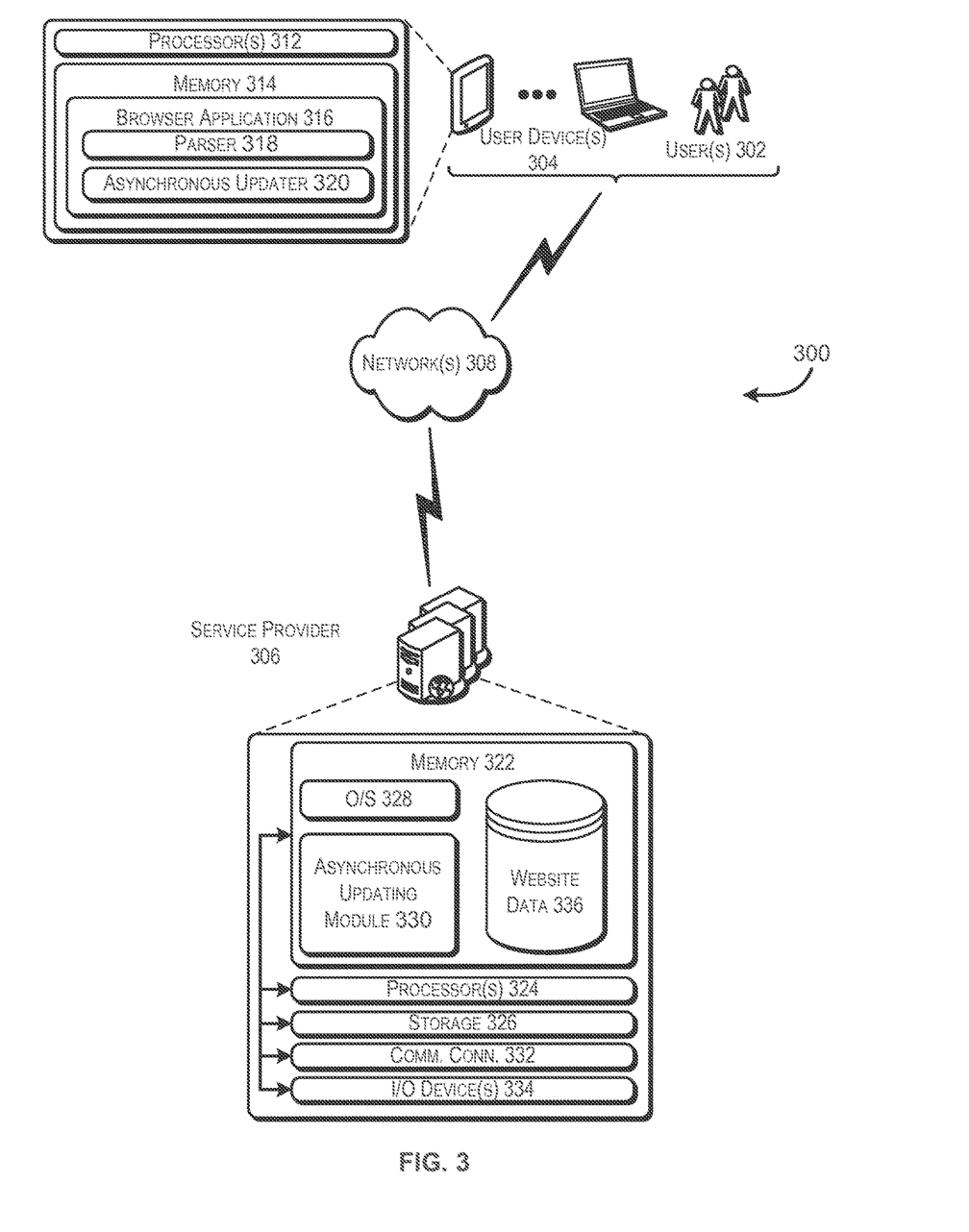
FIG. 3 illustrates a system or architecture for implementing at least one embodiment of the application.

FIG. 3 depicts an illustrative example of a system or architecture 300 in which techniques for making asynchronous updates to websites based on inline REST commands may be implemented. In architecture 300, one or more consumers and/or users 302 may utilize user devices 304. In some examples, the user devices 304 may be in communication with a service provider 306 via the network(s) 308, or via other network connections.

The user devices 304 may be any type of computing device such as, but not limited to, a mobile phone, a smart phone, a personal digital assistant (PDA), a laptop computer, a desktop computer, a server computer, a thin-client device, a tablet PC, etc. The user device 304 may include one or more processors 312 capable of processing user 302 input. Embodiments of the application on the user device 304 may be stored and executed from its memory 314. In one embodiment of the application, the browser application 316 may include a parser 318 and an asynchronous updater 320. In other embodiments of the application, the parser 318 and asynchronous updater 320 may be separate from the browser application 316, such as being a part of a separate application.

Turning to the contents of the memory 314 in more detail, the memory 314 may include a browser application 316. In some embodiments, the browser application will contain a parser 318 and an asynchronous updater 320. In other applications, the parser 318 and asynchronous updater 320 will be part of a computer application separate from the browser application 316.

In some aspects, the parser 318 may be activated by the presence of an indicator 206, and may be configured to extract elements of an inline command 208. The parser 318 may be used to extract one or more selector(s) 210, one or more action indicator(s) 212, and/or one or more parameter (s) 214. Additionally, the parser 318 may be configured to identify and/or ignore portions of an inline command 208 which do not fit into any of these categories.

In some embodiments, the parser 318 may identify a selector 210 from a list of selectors. For example, a list of selectors may include "footer," along with an indication that "footer" refers to a margin along the bottom of each web page. A selector 210 may also be an HTML element. For example, where the HTML for a web page includes <header> and </header> tags, the word "header" could be a used as a selector which indicates the portion of the web page language that is located between the two tags. It is envisioned in this application that the term selector may encompass any word, symbol, or phrase that can identify a portion of a web page.

In some embodiments, the parser 318 may identify a method in an action indicator 212 from a list of actions to be taken. For example, a list of actions may include "font," along with an indication that "font" refers to a method used to update the font type of the text within a portion of the webpage. For example, if the uniform resource locator is updated to http://www.example.com/#/#product-title/font/ verdana, then the term "font" may be associated (via a directory or library) with a method such as set_font( ). The font for element #product-title would then be changed to verdana. Alternatively, the method may be selected from known commands, such as get requests, delete requests, add requests, or update commands. An action indicator 212 may also reference a method or function call, where the method or function is defined outside of the inline command (such as in an HTML document). In this example, parameters can also comprise part of a method or function call. By way of further example, where the inline command 208 contains/ FunctionName/parameter1/parameter2, using the action indicator of "FunctionName" may result in a function call of FunctionName(parameter1, parameter2). Each parameter may also be separated by a symbol or set of symbols. In some embodiments, a default method may exist, which may be called if no method is listed in the action indicator 212.

Although FIG. 3 depicts the parser 318 as being part of the browser application 316, it is envisioned that the parser 318 may be separate from the browser application 316. In some embodiments, the parser 318 may be located on the service provider 306 or even on a separate third-party server.

In some aspects, the asynchronous updater 320 may be configured to request updates for one or more portion(s) of a web page 100. When the parser 318 has extracted at least one selector 210 and at least one action indicator 212, the asynchronous updater may make a request to update the portion of the web page indicated by the selector by taking an action associated with the action indicator. For example, when the inline command "/#search-results/PUT/search/ cooking/page/1" is altered to "/#search-results/PUT/search/ cooking/page/2," the portion of the web page associated with the selector "#search-results" is updated from page 1 of the results to page 2. Here, the applicable method, "PUT," is associated with an action. Depending on how the method "PUT" is handled, a call may be made to search/cooking/ page/2/. The asynchronous updater 320 sends update requests to the service provider 306. Upon receiving a response, the update is made asynchronously, and portions of the web page not indicated by the selector are not updated.

Although FIG. 3 depicts the asynchronous updater 320 as being part of the browser application 316, it is envisioned that the asynchronous updater 320 may be separate from the browser application 316. In some embodiments, the asynchronous updater 320 may be located on the service provider 306 or even on a separate third-party server.

In some examples, the network(s) 308 may include any one or a combination of many different types of networks, such as cable networks, the Internet, wireless networks, cellular networks, and other private and/or public networks. While the illustrated example represents the users 302 accessing the browser application 316 over the network(s) 308, the described techniques may equally apply in instances where the users 302 interact with a service provider 306 via the user device 304 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 316 may allow the users 302 to interact with a service provider 306, such as to store, access, and/or manage data, develop and/or deploy computer applications, and/or host web content. The one or more service provider(s) 306, perhaps arranged in a cluster of servers or as a server farm, may host the browser application 316. These servers may be configured to host a website (or combination of websites) viewable via the user device 304 or a web browser accessible by a user 302. Other server architectures may also be used to host the browser application 316. The browser application 316 may be capable of handling requests from many users 302 and serving, in response, various user interfaces that can be rendered at the user device 304 such as, but not limited to, a web site. The browser application 316 can be any type of website that supports user interaction, including social networking sites, electronic retailers, informational sites, blog sites, search engine sites, news and entertainment sites, and so forth. As discussed above, the described techniques can similarly be implemented outside of the browser application 316, such as with other applications running on the user device 304.

The service provider 306 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 306 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment.

In one illustrative configuration, the service provider 306 may include at least one memory 322 and one or more processing units (or processor(s)) 324. The processor(s) 324 may be implemented as appropriate in hardware, computer-executable instructions, firmware or combinations thereof. Computer-executable instruction or firmware implementations of the processor(s) 324 may include computer-executable or machine executable instructions written in any suitable programming language to perform the various functions described.

The memory 322 may store program instructions that are loadable and executable on the processor(s) 324, as well as data generated during the execution of these programs. Depending on the configuration and type of service provider 306, the memory 322 may be volatile (such as random access memory (RAM)) and/or non-volatile (such as read-only memory (ROM), flash memory, etc.). The service provider 306 may also include additional storage 326, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 322 may include multiple different types of memory, such as static random access memory (SRAM), dynamic random access memory (DRAM) or ROM. Turning to the contents of the memory 322 in more detail, the memory 322 may include an operating system 328 and one or more application programs or services for implementing the features disclosed herein including at least a module for asynchronously updating a web page (asynchronous updating module 330).

The memory 322 and the additional storage 326, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 304 or the service provider 306. The service provider 306 may also contain communications connection(s) 332 that allow the service provider 306 to communicate with a stored database, another computing device or server, user terminals, and/or other devices on the network(s) 308. The service provider 306 may also include input/output (I/O) device(s) and/or ports 334, such as for enabling connection with a keyboard, a mouse, a pen, a voice input device, a touch input device, a display, speakers, a printer, etc.

Turning to the contents of the memory 322 in more detail, the memory 322 may include an operating system 328, a database containing network data 336 and the one or more application programs or services for implementing the features disclosed herein, including an asynchronous updating module 330.

In some embodiments, the asynchronous updating module 330 may be configured to receive update requests from the asynchronous updater 320. In response to receiving an update request, the updating module 330 may configured to send a response containing the requested update to the browser application, wherein the response affects only the portion of the web page identified in the request.

Figure 4:
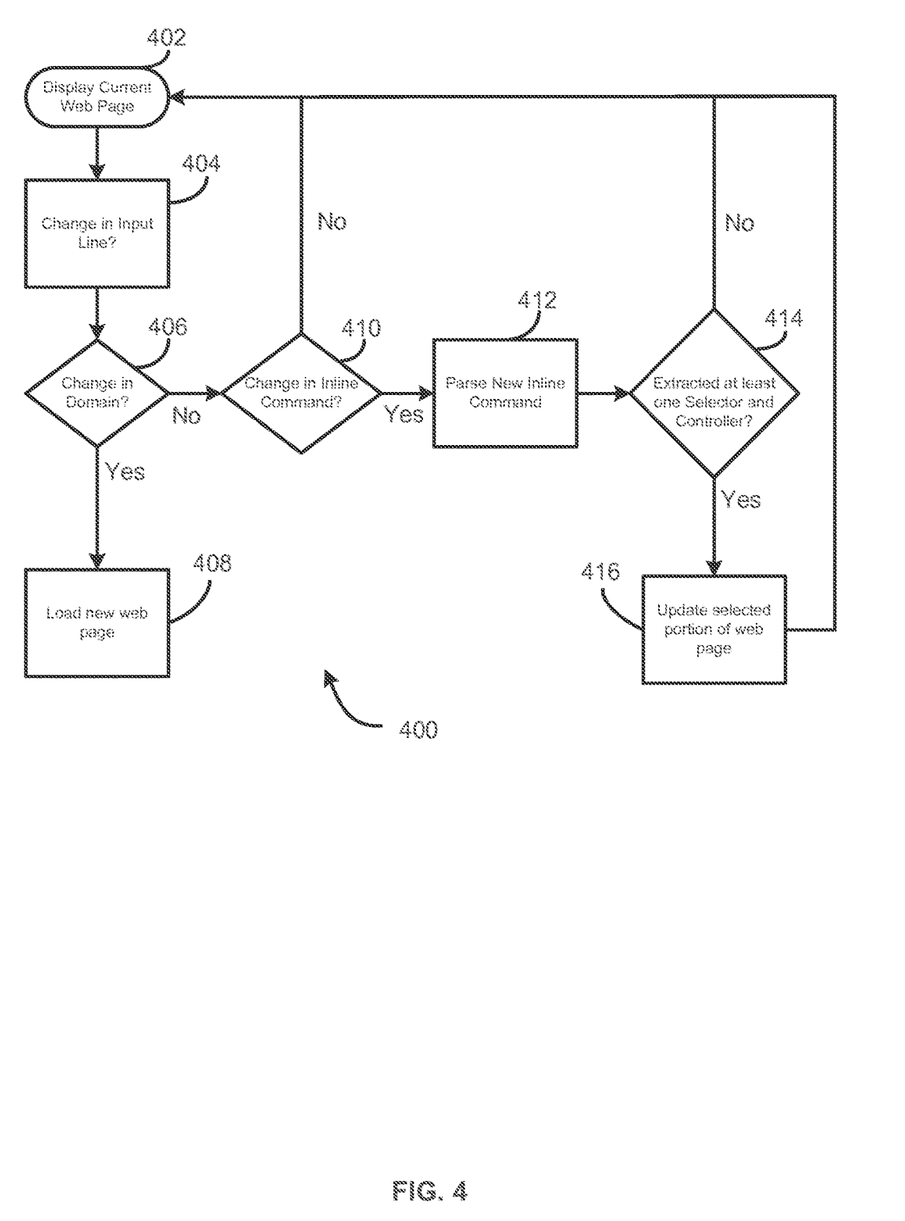
FIG. 4 is a flowchart showing an illustrative example of a process of asynchronously updating a portion of a web page.

FIG. 4 is a flowchart showing an illustrative example of a process of asynchronously updating a portion of a web page. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof, such as system or architecture 300. The code may be stored on a computer-readable storage medium, for example, in the form of a computer program comprising a plurality of instructions executable by one or more processors. The computer-readable storage medium may be non-transitory.

In the process 400 shown in FIG. 4, a current web page is displayed by a browser application at 402. The browser application may have an area for providing user input, such as an address bar, which may be populated with an input line, such as a URL. When a change is detected in the input line at 404, that change is analyzed. At 406, if the inline line change is determined to be a change in the domain, then a web page for the new domain is loaded at 408. In some embodiments, the web page that is associated with the new domain name may have the present action indicator and selector applied to it when the domain name is changed. If there is no change in the domain, then the process 400 determines at 410 whether the input line change was made to the inline command. If no change was made to the inline command, then no changes are made to the currently displayed web page. However, if changes are detected in the inline command, then the new inline command is parsed at 412. At least one selector and one action indicator must be parsed from the inline command, although additional input can also be extracted. If the minimum one selector and one action indicator are not able to be extracted at 414, then no changes are made to the currently displayed web page. Otherwise, a request is sent at 416 to update only that portion of the web page selected by the selector. Once the update has been made to that portion of the web page, the current web page is displayed.

Figure 5:
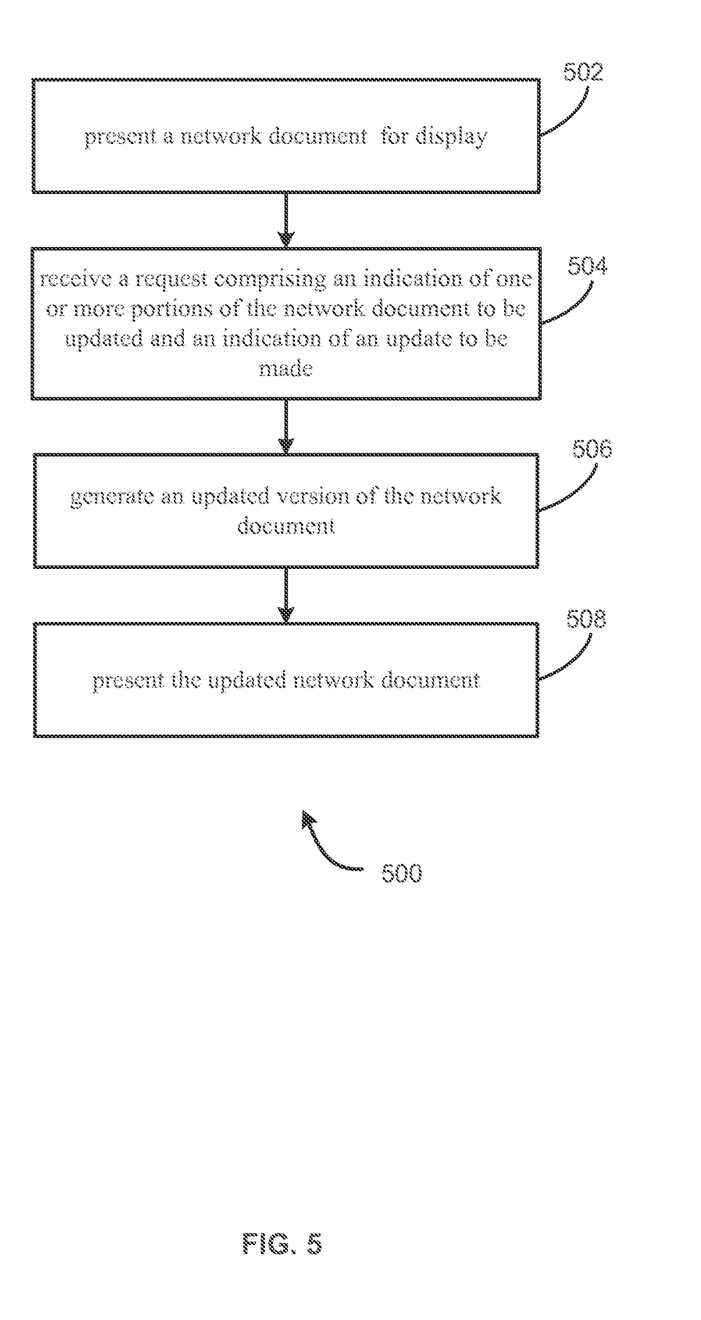
FIG. 5 is a block diagram showing an illustrative example of a process of asynchronously updating a portion of a web page.

FIG. 5 is a block diagram showing an illustrative example of a process of asynchronously updating a portion of a web page. Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof, such as system or architecture 300. The code may be stored on a computer-readable storage medium, for example, in the form of a computer program comprising a plurality of instructions executable by one or more processors. The computer-readable storage medium may be non-transitory.

In the process 500 shown in FIG. 5, a network document is displayed by a browser application at 502. This network document should be one that is capable of having portions of the document updated asynchronously. One example of such a network document may be a web page that supports web development techniques such as Asynchronous JavaScript and XML (AJAX) or JavaScript Object Notation (JSON). In the process 500 at 504, a request is received to update a portion of the network document. The request should contain at least an indication of a portion of a network document to be updated as well as what update is to be made to that portion of the network document. In some aspects of process 500, the request may be entered by a user into an address bar of the browser application. Once the request is received, an updated version of the network document is generated at 506. In this updated version, only the indicated portion of the network document will be changed. The changes made to that portion of the network document indicated should be based on the update that was identified in the received request. Once an updated version of the network document is generated, the updated portions are presented for display by the browser application at 508.

Figure 6:
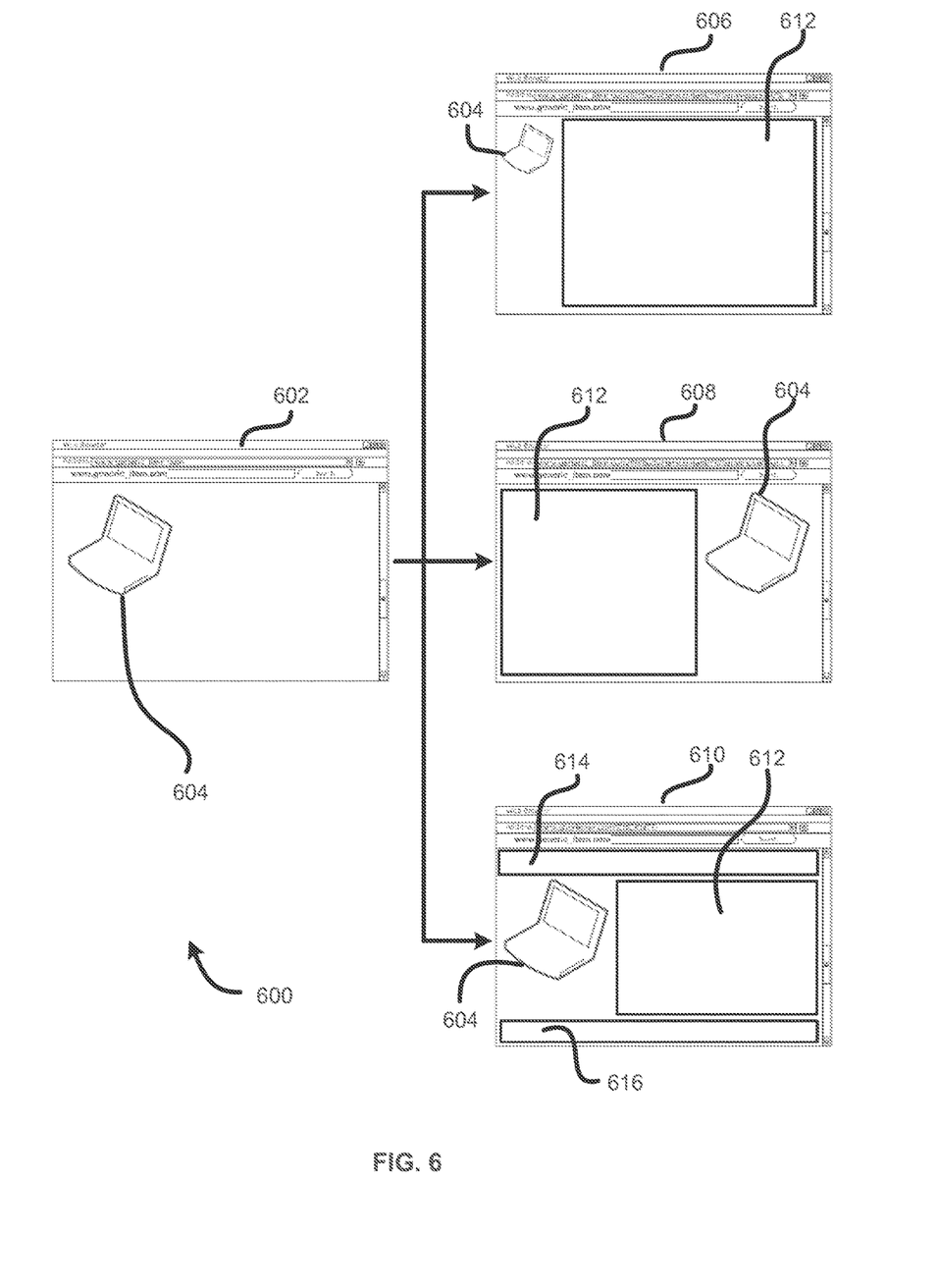
FIG. 6 illustrates an illustrative example implementation of the present application.

FIG. 6 illustrates an example implementation 600 of the present application. In implementation 600, a generic web page 602 (or network document) is provided. The generic web page 602 may have a predetermined structure or architecture. In some embodiments, the web page 602 may be segmented into portions, such as through the use of HTML tags. The generic web page 602 may be associated with one or more items 604. In some embodiments, the item 604 may be a product for sale by a merchant. In other embodiments, the item 604 may be a computer application, a widget, or text. In implementation 600, one or more users may be able to create one or more customized versions of the generic web page 602, such as those depicted in 606, 608, and 610.

In some embodiments, a selector 210 may indicate an item 604 (rather than a location on the web page) and the action indicator may indicate an action to be taken with regard to that item 604. For example, in custom web page 606 the item 604 has been resized to 50% of its size in generic web page 602. For another example, custom web page 608 shows the item 604 moved to the top right of the page.

In some embodiments, one or more instances of additional content 612 may be added to a custom web page 606. The additional content 612 may consist of text, an application or widget, advertisements, or any other type of content. Furthermore, segments may be added to or deleted from a web page. For example, custom web page 610 depicts the addition of a header 614 and footer 616.

In example implementation 600, multiple customized versions of the generic web page 602 (such as those depicted in 606, 608, and 610) may be sent to various users, allowing customized access to the generic web page 602. For example, in an embodiment in which the generic web page 602 is provided by a merchant, several vendors may create custom versions of web page 602. The vendors would be able to customize the user experience for their specific web page in order to target different market segments or provide different product information, such as ratings. The vendors would then be able to provide access to their customized version of the generic web page 602 by providing a link for, or redirecting traffic to, the web page. For purposes of this example, it is envisioned that a vendor may wish to provide a shortened version of the URL by using a URL shortener. In this example, the merchant may be able to determine commission for each sale made through a vendor's custom web page.

Figure 7:
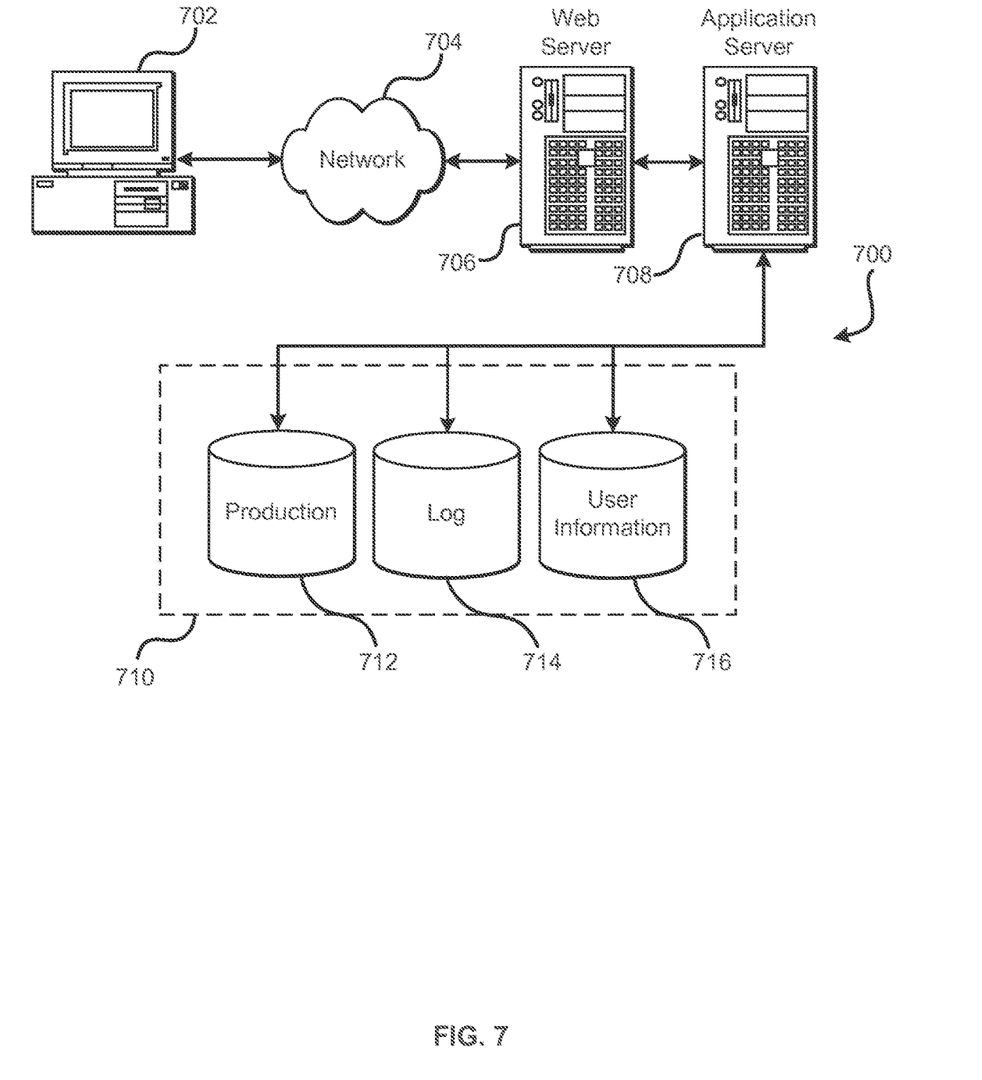
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, action indicator, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   presenting, by a computing system, a network document associated with a uniform resource locator, the network document having a predetermined structure and being presented in a browser;
   upon detecting a change in the uniform resource locator, and upon determining that the change in the uniform resource locator does not impact a domain name in the uniform resource locator associated with the network document, processing the change as a request from a user, the request comprising:
      a first selector which indicates a first portion of the network document, the first portion comprising less than the entire network document;
      a first action indicator which indicates a first change to be made to the first portion of the network document indicated by the first selector such that portions of the network document other than the indicated first portion remain unaffected by the first change, the first action indicator comprising a first method to be performed with respect to the indicated first portion that causes the first portion to be resized from its position in the predetermined structure;
      a second selector which indicates a second portion of the network document that is distinct from the first portion of the network document, the second portion comprising less than the entire network document; and
      a second action indicator which indicates a second change to be made to the second portion of the network document indicated by the second selector such that portions of the network document other than the indicated second portion remain unaffected by the second change, the second action indicator comprising a second method to be performed with respect to the indicated second portion that causes the second portion to be resized from its position in the predetermined structure;
   asynchronously updating, by the computing system, the first portion of the network document such that the first portion is updated based on the first method, based at least in part on information contained within the request, with portions of the network document other than the indicated first portion of the network document remaining unchanged by the first change;
   asynchronously updating, by the computing system, the second portion of the network document such that the second portion is updated based on the second method, based at least in part on the second selector and the second action contained within the request, with portions of the network document other than the indicated second portion of the network document remaining unchanged by the second change; and causing the network document with the updated first portion and the updated second portion to be presented in the browser.

2. The computer-implemented method of claim 1, further comprising providing capability for a user to store at least one of the first selector and first action indicator or the second selector and second action indicator in the memory of the computing system.

3. The computer-implemented method of claim 2, wherein the stored first selector and first action indicator or second selector and second action indicator are included in the uniform resource locator for subsequent requests by the user independent of further user interaction.

4. The computer-implemented method of claim 1, wherein the updated network document is provided for display to one or more additional computing systems.

5. The computer-implemented method of claim 1, wherein the request is received in the uniform resource locator in response to the user's interaction with an optional input associated with the network document.

6. The computer-implemented method of claim 1, wherein the browser is configured to receive, in the uniform resource locator, a plurality of requests for a single network document.

7. A computer-implemented method, comprising:
upon detecting a uniform resource locator, providing a network document associated with a domain name of the uniform resource locator for display, the network document having a predetermined structure;
detecting a change in the uniform resource locator, wherein the change does not affect the domain name of the uniform resource locator;
processing the detected change as a request generated by a user, the request comprising:
a first selector which indicates a first portion of the network document less than the entire network document;
a first action indicator which indicates a change to be made to the first portion of the network document indicated by the first selector, the first action indicator comprising a method to be performed with respect to the indicated first portion and causing the indicated first portion to be resized from its position in the predetermined structure;
a second selector which indicates a second portion of the network document that is distinct from the first portion of the network document, the second portion comprising less than the entire network document; and
a second action indicator which indicates a second change to be made to the second portion of the network document indicated by the second selector such that portions of the network document other than the indicated second portion remain unaffected by the second change, the second action indicator comprising a method to be performed with respect to the indicated second portion and causing the indicated second portion to be resized from its position in the predetermined structure;
asynchronously updating the first portion of the network document indicated by the first selector to reflect the change indicated by the first action indicator independent of changes to the second portion of the network document such that at least the second portion of the network document remain unaffected by the update;
asynchronously updating the second portion of the network document, based at least in part on the second selector and the second action contained within the request, with portions of the network document other than the indicated second portion of the network document remaining unchanged by the second change; and
providing the updated first portion of the network document and the updated second portion of the network document for display.

8. The computer-implemented method of claim 7, wherein the request further comprises at least one parameter.

9. The computer-implemented method of claim 7, wherein the request is received in an input line associated with the network document appended to the uniform resource locator.

10. The computer-implemented method of claim 7, wherein the first action indicator comprises at least one of a method call to be performed by an object associated with the first selector or a function call to be taken with regard to the first selector.

11. A system, comprising:
a processor; and
a memory device including instructions that, when executed by the processor, cause the system to:
receive an indication of a uniform resource locator, the uniform resource locator including at least a domain name;
provide a segmented network document associated with the domain name for presentation, the segmented network document comprising a plurality of segments in a predetermined structure;
detect a change to a section of the uniform resource locator other than the domain name associated with the segmented network document;
process the detected change as an inline request to update at least two indicated segments of the segmented network document, the request generated by a user and including more than one change, wherein the more than one change comprises at least a first change to be made to a first segment of the segmented network document which affects the first segment and at least a second change to be made to a second segment of the segmented network document which affects the second segment;
asynchronously generate an updated version of the segmented network document by making the requested first change to the first segment of the segmented network document while leaving segments of the network document other than the first segment unchanged and making the requested second change to the second segment of the segmented network document while leaving segments of the network document other than the second segment unchanged, wherein the inline request comprises at least one method to be performed with respect to at least the first segment and second segment that causes the at least the first segment and second segment to be resized from the predetermined structure; and
provide the updated version of the segmented network document for presentation.

12. The system of claim 11, wherein the requested more than one change comprises at least one of a display of a network application or a replacement of the content of the indicated segment with new content.

13. The system of claim 11, wherein the first segment of the network document is indicated by the use of a hypertext markup language element.

14. The system of claim 11, wherein the first segment of the network document is chosen from a list of segments.

15. A non-transitory computer readable storage medium storing instructions for providing a network document, the instructions when executed by a processor causing the processor to:

receive an indication of uniform resource locator, the uniform resource locator including at least a domain name associated with the network document;

present a network document for display, the network document being capable of being customized asynchronously based at least in part on the uniform resource locator associated with the network document;

receive, as a change to the uniform resource locator other than to the domain name, an inline command request generated by a user for a customization to be applied to the network document, the customization comprising:

a first indication of at least a first portion of the network document to be customized, a second indication of at least one first update to be applied to the first portion of the network document, the second indication of at least one first update comprising a method to be performed with respect to the first portion and causing the first portion to be resized, a third indication of at least a second portion of the network document to be customized, and a fourth indication of at least one second update to be applied to the second portion of the network document, the fourth indication of at least one second update comprising a method to be performed with respect to the second portion and causing the second portion to be resized;

generate a customized version of the network document, asynchronously updating the first portion of the network document such that portions of the network document other than the first portion remain unaffected by the first update, and by applying the second update to the indicated second portion of the network document such that portions of the network document other than the second portion remain unaffected by the second update; and present the customized version of the network document for display with the applied update.

16. The non-transitory computer readable storage medium of claim 15, wherein the customization is capable of being stored on the computer readable storage medium.

17. The non-transitory computer readable storage medium of claim 15, wherein the customization is further applied to at least one subsequently presented network document without receiving a request for the customization to be applied to the at least one subsequently presented network document.

18. The non-transitory computer readable storage medium of claim 15, wherein multiple customized versions of the network document are presented simultaneously.

19. The non-transitory computer readable storage medium of claim 15, wherein the multiple customized versions of the network document are generated from a plurality of customizations, at least one customization of the plurality of customizations having at least one variation either in the first indication of the first portion of the network document to be customized or in the second indication of the first update to be applied.

* * * * *